United States Patent
Lo

(10) Patent No.: US 7,480,983 B2
(45) Date of Patent: Jan. 27, 2009

(54) METHOD FOR MAKING MAGNETIC WRITE HEAD

(75) Inventor: Jyh-Shuey Jerry Lo, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 758 days.

(21) Appl. No.: 10/856,637

(22) Filed: May 28, 2004

(65) Prior Publication Data

US 2005/0262686 A1    Dec. 1, 2005

(51) Int. Cl.
  *G11B 5/127* (2006.01)
(52) U.S. Cl. ............ 29/603.12; 29/603.15; 29/63.16; 29/603.18
(58) Field of Classification Search ............ 29/603.12, 29/603.16, 603.15, 603.18; 451/57, 58, 48; 360/122, 126, 317, 322; 240/192.34, 192.35, 240/192.32, 192.33; 427/130, 128; 216/22; 204/192.34
  See application file for complete search history.

(56) References Cited

U.S. PATENT DOCUMENTS

| | | | |
|---|---|---|---|
| 4,457,820 A * | 7/1984 | Bergeron et al. ............ 438/9 |
| 5,438,747 A * | 8/1995 | Krounbi et al. .......... 29/603.16 |
| 5,639,509 A * | 6/1997 | Schemmel .................. 427/130 |
| 5,726,841 A | 3/1998 | Tong et al. .................. 360/122 |
| 5,804,085 A | 9/1998 | Wu et al. ...................... 216/22 |
| 5,916,423 A * | 6/1999 | Westwood ............. 204/192.32 |
| 5,935,453 A * | 8/1999 | Fontana et al. ................ 216/22 |
| 5,938,941 A * | 8/1999 | Ishiwata et al. ............... 216/22 |
| 6,111,724 A | 8/2000 | Santini ....................... 360/126 |
| 6,141,183 A | 10/2000 | Wu et al. .................... 360/126 |
| 6,258,283 B1 * | 7/2001 | Mikami et al. ................ 216/22 |
| 6,281,025 B1 * | 8/2001 | Ring et al. .................... 438/10 |
| 6,370,763 B1 * | 4/2002 | Watanuki et al. ......... 29/603.09 |
| 6,433,970 B1 * | 8/2002 | Knapp et al. ................. 360/322 |
| 6,445,550 B1 * | 9/2002 | Ishi ........................... 360/317 |
| 6,532,646 B2 * | 3/2003 | Watanuki ................. 29/603.12 |
| 6,539,610 B1 * | 4/2003 | Lo et al. ................... 29/603.07 |
| 2003/0002212 A1 | 1/2003 | Chen et al. .................. 360/126 |

* cited by examiner

*Primary Examiner*—David P Bryant
*Assistant Examiner*—Tai Nguyen
(74) *Attorney, Agent, or Firm*—John L. Rogitz

(57) ABSTRACT

Two trim/notch milling steps are used to refine the track width that is defined by the second pole piece tip of a write head. The second milling step uses feedback gained after the first milling step to refine the P2B (pole P2 bottom width) dimension. A final milling step may be conducted after receiving feedback from the result of the second trim/notch milling step.

6 Claims, 2 Drawing Sheets

METHOD FOR MAKING MAGNETIC WRITE HEAD

I. FIELD OF THE INVENTION

The present invention generally relates to methods for making write heads for use in magnetic storage systems.

II. BACKGROUND

In magnetic disk drives, data is written and read by magnetic transducers called "heads." The magnetic disks are rotated at high speeds, producing a thin layer of air called an air bearing surface (ABS). The read and write heads are supported over the rotating disk by the ABS, where they either induce or detect flux on the magnetic disk, thereby either writing or reading data. Layered thin film structures are typically used in the manufacture of read and write heads. In write heads, thin film structures provide high areal density, which is the amount of data stored per unit of disk surface area, and in read heads they provide high resolution.

A thin film write head may have two pole pieces, namely, a top pole piece (colloquially referred to as "P2") and a bottom pole piece ("P1"). A write head generally has two regions, denoted a pole tip region and a back region. The pole pieces are formed from thin magnetic material films and converge in the pole tip region at a magnetic recording gap, and in the back region at a back gap. A write head also has two pole tips, sometimes denoted "P1T" and "P2T", that are associated with and that are extensions of the poles P1 and P2, respectively. The pole tips, which are relatively defined in their shape and size in contrast to the pole pieces, are separated from each other by a thin layer of non-magnetic material such as alumina or Rhodium, referred to as a gap. As a magnetic disk is spinning beneath a write head, the P2 pole tip P2T trails the P1 pole tip P1T and is therefore the last to induce flux on the disk. Thus, the P2T dimension predominantly defines the write track width of the write head, and is generally considered an important feature.

The write track width, which is related to the width "P2B" of the bottom of the pole P2, is especially important because it limits the areal density of a magnetic disk. A narrower track width translates to greater tracks per inch (TPI) written on the disk, which in turn translates to greater areal density. However, with present manufacturing methods for read-write heads, the ability to produce very narrow track widths is limited. These limitations will be further explained with reference to a specific type of inductive head. Inductive heads commonly employed at present are magnetoresistive (MR) sensors, which are highly sensitive to changes in magnetic flux on a disk written by inductive write heads. An MR sensor includes a thin film layer sandwiched between bottom and top insulation layers, or gaps, which are in turn sandwiched between bottom and top shield layers, S1 and S2. An MR head can read information on a magnetic disk with much narrower track widths an much higher fidelity than other known types of read heads. The apparent ability of MR sensors to read very narrow track widths may enable the use of narrow track width write heads and therefore lead to high areal densities. While this advantage has been sought through the use of photoresist frame plating and ion beam milling of write heads, manufacturing heads with very narrow track widths remains a significant challenge.

A particular type of MR head is a so-called "piggy back" MR head. A "piggy back" MR head has a shield S2 and a bottom pole P1 of the write head. While such MR heads have a high capacity for both reading and writing, they are limited in the narrowness of the track width they may utilize because they have been found to possess large side-fringing fields during recording. These fields are caused by differences in pole tip (P1T and P2T) widths. The fringing field, caused by flux leakage from the second pole P2 to the first pole P1 beyond the width of the second pole P2, is the portion of the magnetic field which extends toward the tracks adjacent to the tracks being written. The fringing fields require lower pole tip TP1 in order not to impinge adjacent tracks, thereby limiting the achievable areal density.

The present invention thus understands that current methods for making write heads result in relatively high track width "sigmas", or differences between track widths wafer to wafer in the manufacturing process. Also, the present invention understands that current methods can result in undesirably high differences between the widths "P1A" and "P2B" of the poles tips P1T, P2T and in undesirably high differences between the wall angle tapers of the poles P1, P2.

SUMMARY OF THE INVENTION

A process for manufacturing a magnetic write head includes executing a first trim/notch mill of at least one write head pole piece, and generating feedback of results of the first trim/notch mill. The method also includes executing a second trim/notch mill based at least in part on the feedback.

In non-limiting implementations the feedback can represent a pole piece width, and a time period of a trim of the second trim/notch mill can be established based at least in part on the feedback. If desired, the method may include generating feedback of results of the second trim/notch mill and then executing a final trim mill based at least in part on the feedback of results of the second trim/notch mill. Prior to the first trim/notch mill, the method might execute a wall deposition removal mill.

In another aspect, a method for establishing a desired write track width of a write head includes executing a first trim/notch process of a second pole piece P2 and stopping the first trim/notch process. Then, the method includes executing a second trim/notch process of a second pole piece P2 based at least in part on information relating to the first trim/notch process.

In yet another aspect, a method of using a magnetic write head manufacturing facility includes establishing a small wafer-to-wafer write track width sigma based at least in part on using feedback generated between first and second trim/notch mills.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
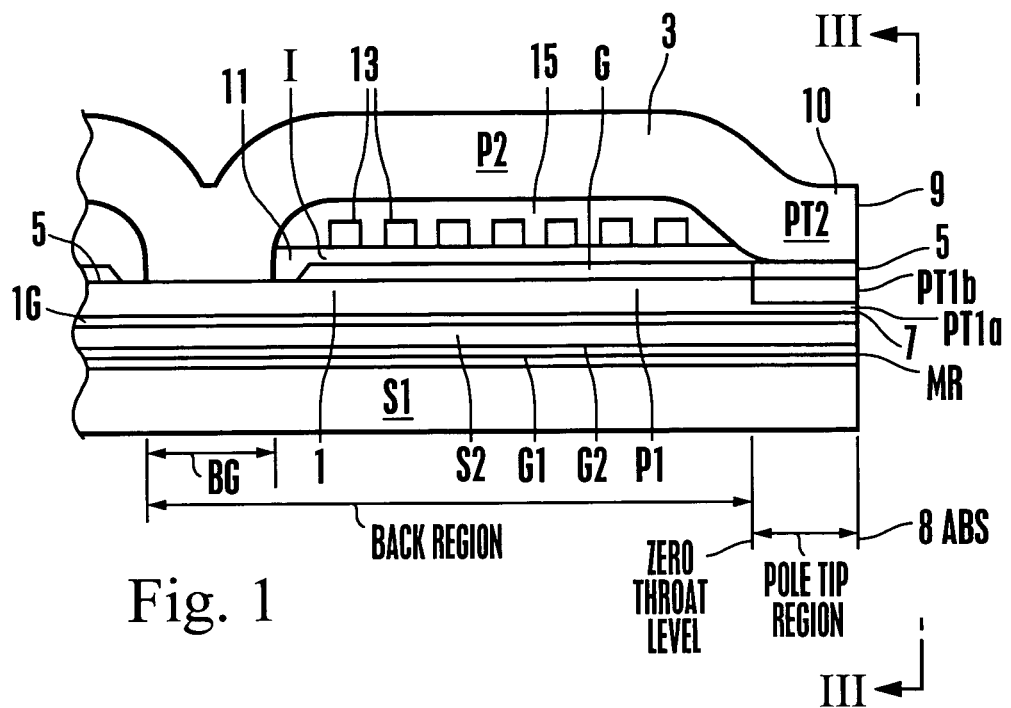
FIG. 1 is a side view of a MR head.

Referring initially to FIG. 1, an MR or GMR head is shown which is manufactured using the process of the present invention. The head includes first and second pole pieces 1 and 3 denoted P1 and P2, respectively. The pole piece P1 is separated by an intermediate gap "IG" from a second shield S2. The pole pieces 1 and 3 are separated by a gap 5 and bounded by an ABS 8 at a pole tip region of the head. The pole pieces P1 and P2 are magnetically connected where they are separated by the gap. The pole pieces converge at a back region of the head, such that they are not separated by a gap in this region. Extending from the pole pieces are two pole tips 7 and 9 in the pole tip region, denoted PT1 and PT2 respectively. The pole tips are shaped and defined relative to their respective pole pieces by the process set forth herein. An MR head may also include a first insulation layer 11, a coiled conductor layer 13, and a second insulation layer 15.

A method according to an embodiment of the present invention employs a combination of known thin film photolithography and ion beam milling steps with unique feedback. In the exemplary embodiment, photolithography can be used to deposit magnetic layers using photoresist frame plating, and is used to deposit insulation layers with a photoresist and developing process. Those skilled in the art will appreciate that photolithography is exemplary only and that alternative deposition methods are contemplated as being within the scope of the present invention. These can include electroplating, cathodic sputtering, ion beam deposition, and the like.

Figure 2:
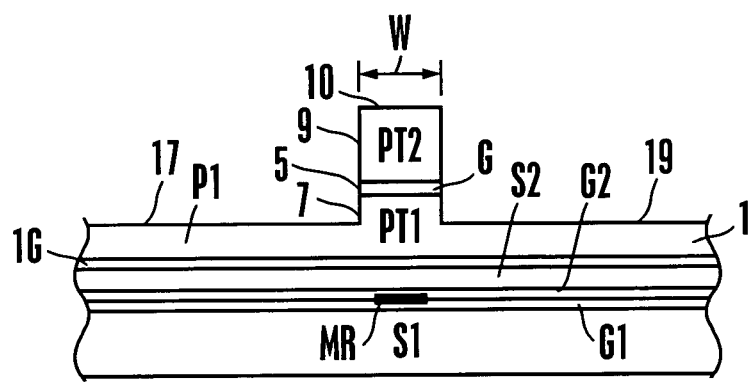
FIG. 2 is an air bearing surface (ABS) view of a MR head taken along plane III-III in FIG. 1.

Definition of the pole tips is shown in FIG. 2, where the pole tips 7 and 9 are separated by a gap 5. Fringing fields, which otherwise can limit the narrowness of pole tips, are caused by the greater width of the first pole piece 1 relative to the narrow gap 5 and second pole tip 9. To reduce the fringing field, the first pole P1 may be notched, which involves removal of a significant amount of material from the first pole piece at field regions 17 and 19, as well as from the top of the second pole piece tip P2T, indicated at 10 in FIG. 2. Also, pole cleaning can be used if desired to remove redeposition material from the vertical side walls of the pole tips PT1 and PT2, as shown in FIG. 2, in an effort to reduce fringing fields.

Figure 3:
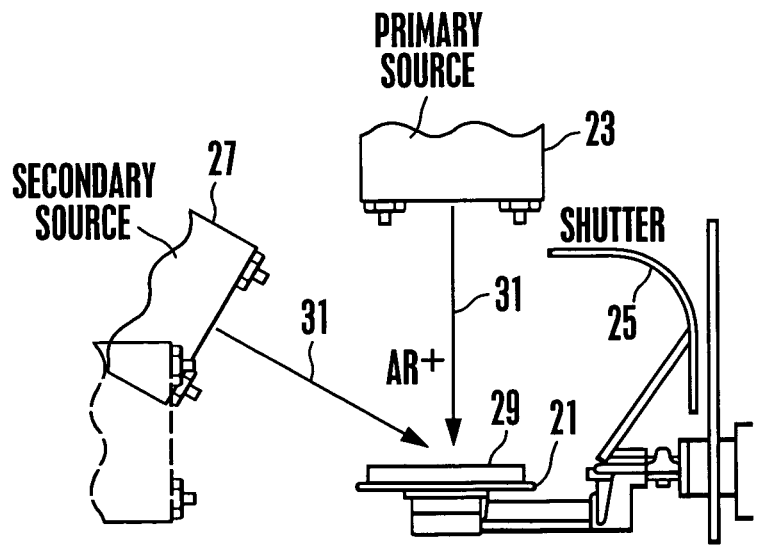
FIG. 3 is a schematic of an exemplary ion beam chamber.

FIG. 3 shows an exemplary non-limiting processing chamber. The work piece, which may be a wafer 29 with more than 20,000 heads, is mounted on a turntable 21 and rotated while it is milled by a primary ion beam source 23 at an angle between 0 degrees and 50 degrees or more from the wafer normal. A shutter 25 may be employed to control various steps in the process. According to known manufacturing methods, a secondary ion beam source 27 may be utilized for cleanup of redeposition from the side walls of the first and second pole pieces P1 and P2. Alternatively, a single ion beam source may be used for both notching and cleanup operations by rotating the stage 29 to obtain the various angles appropriate for each function.

Figure 4:
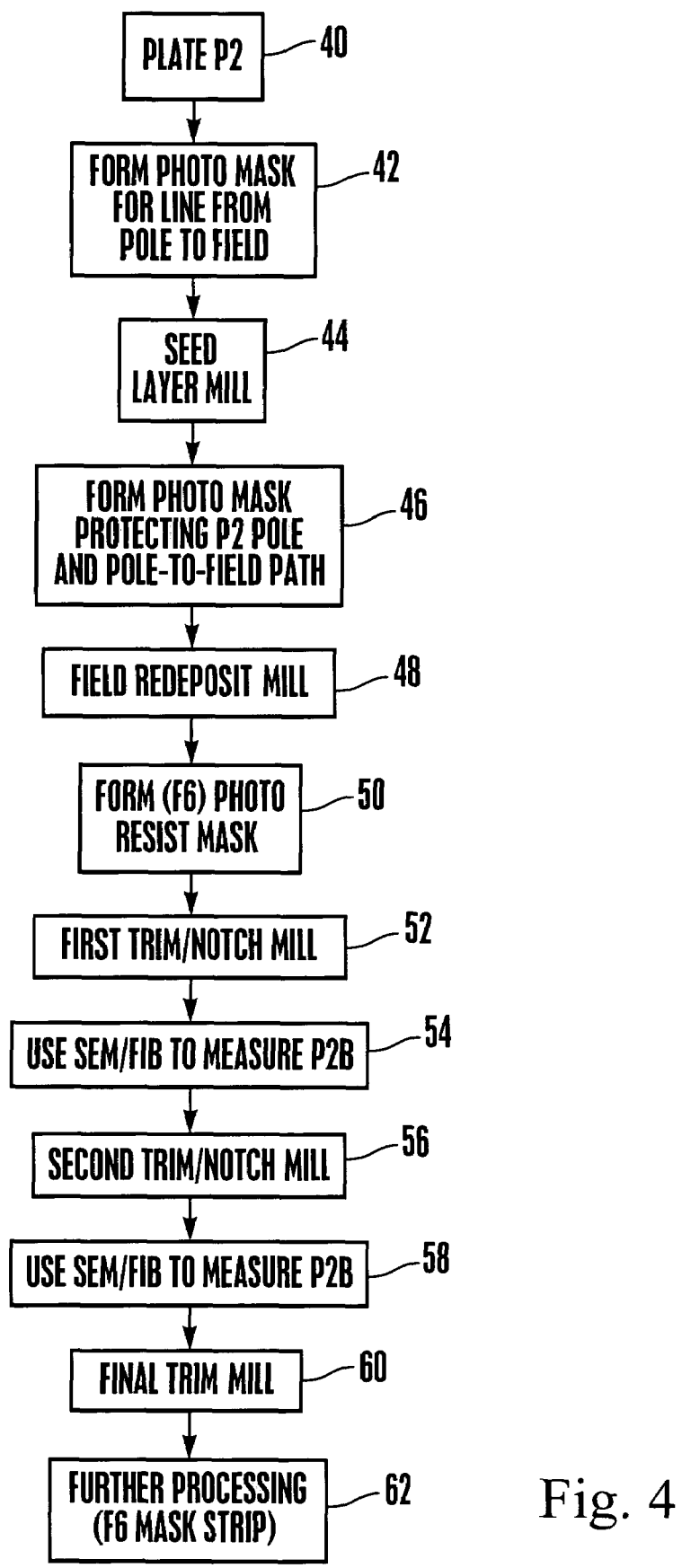
FIG. 4 is a flow chart of the present process.

Now referring to FIG. 4, the present method can be seen. Commencing at block 40, the material for the second pole P2 is plated in accordance with principles known in the art over the first pole P1, and then at block 42 a photoresist mask is formed over the region that will establish an electrical conductor line from the pole to the field of the second pole P2, also in accordance with principles known in the art.

Moving to block 44, a seed layer strip mill is performed to strip away non-masked seed layer material and, if used, metal gap material. In accordance with present principles, the method then moves to block 46 to form a photo mask protecting the second pole P2 and the pole-to-field path established above, with a wall redeposition removal mill then being executed at block 48 to remove redeposited material on the walls of the field portion of the second pole P2. This improves the quality of the gap and the second pole tip P2T, and preserves second pole tip P2T material.

According to the present invention, the process moves to block 50 to begin the present inventive trim/notch procedure. At block 50, a so-called "F6" photoresist mask is formed over materials that are not to be subject to the trim/notch milling steps below, and specifically over materials other than the areas that will establish the pole tips. Then at block 52 a first trim/notch mill is executed to form the second pole tip P2T and in particular to coarsely form the width P2B of the bottom of the pole P2. In one non-limiting embodiment this mill can be, e.g., a sixty degree rough trim, followed by a thirty degree to forty five degree notching, and a fifty degree cleansing sub-step to ensure pole piece wall cleanliness and quality. The degrees referred to above refer to milling beam orientations relative to the plane in which the wafer is disposed and are non-limiting.

After the first trim/notch mill, the procedure uses, e.g., a focussed ion beam (FIB) or scanning electron microscope (SEM) or other appropriate scanning device to scan the pole pieces to provide feedback at block 54. The feedback can be computer-usable data regarding, e.g., the width P2B of the bottom of the second pole tip PT2, pole piece wall angles and contours, etc. and/or it can be an image that an operator can view to determine the results of the first mill and in particular the dimension P2B. In one preferred non-limiting embodiment, the feedback represents the actual mean P2B as measured from where the air bearing surface (ABS) would be during operation.

Block 56 indicates that a second trim/notch mill is then executed in view of the feedback provided at block 54 to refine the pole bottom width P2B. In one non-limiting embodiment this mill can be, e.g., a sixty degree rough trim, a thirty degree to forty five degree notching, and a fifty degree cleansing sub-step to ensure pole piece wall cleanliness and quality. By way of non-limiting example, an operator can view an image produced at block 54 to ascertain how long the second milling process, and in particular the second trim, should take to achieve a desired track width, given the measurement of actual pole bottom width P2B generated at block 54. Or, a computer can be programmed to, e.g., adjust the temporal length of the trim of the second milling step based on the measured P2B at block 54.

After the second trim/notch mill, the procedure again uses a FIB/SEM to scan the pole pieces to provide additional feedback at block 58, and specifically to measure the bottom width P2B. At block 60, a final trim to achieve a desired, final P2B dimension is undertaken using the feedback generated at block 58 in accordance with principles set forth above. The final trim preferably mills the wafer with an angle of forty degrees to fifty five degrees. Block 62 simply indicates that in accordance with principles known in the art, further processing can be undertaken, such as, e.g., stripping the mask over the F6 areas.

While the particular METHOD FOR MAKING MAGNETIC WRITE HEAD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for establishing a desired write track width of a write head, comprising the steps of:
    executing a first trim/notch process of a second pole piece P2;
    stopping the first trim/notch process; and
    executing a second trim/notch process of a second pole piece P2 based at least in part on information relating to the first trim/notch process, the information being obtained between the first and second trim/notch processes.

2. The method of claim 1, wherein the information represents a pole piece width.

3. The method of claim 1, wherein at least a time period of the second trim/notch process is established based at least in part on the information.

4. The method of claim 1, wherein at least a time period of a trim of the second trim/notch process is established based at least in part on the information.

5. The method of claim 1, further comprising:
    generating information representing results of the second trim/notch process; and
    executing a final trim mill based at least in part on the information representing results of the second trim/notch process.

6. The method of claim 1, further comprising:
    prior to the first trim/notch process, executing at least one wall redeposition removal mill.

* * * * *